US008803448B2

(12) United States Patent
Brown et al.

(10) Patent No.: US 8,803,448 B2
(45) Date of Patent: *Aug. 12, 2014

(54) CONSTANT CURRENT OUTPUT SINK OR SOURCE

(71) Applicant: Microchip Technology Incorporated, Chandler, AZ (US)

(72) Inventors: Ward R. Brown, Chandler, AZ (US); Randy Yach, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,859

(22) Filed: Apr. 19, 2013

(65) Prior Publication Data

US 2013/0234623 A1    Sep. 12, 2013

Related U.S. Application Data

(63) Continuation of application No. 12/622,745, filed on Nov. 20, 2009, now Pat. No. 8,427,075.

(60) Provisional application No. 61/121,932, filed on Dec. 12, 2008.

(51) Int. Cl.
*H05B 37/02*    (2006.01)

(52) U.S. Cl.
USPC .................... 315/307; 315/224; 315/287

(58) Field of Classification Search
USPC ............ 315/209 R, 224–226, 287, 291, 294, 315/297, 306, 307, 308
See application file for complete search history.

(56) References Cited

U.S. PATENT DOCUMENTS

| | | | |
|---|---|---|---|
| 5,812,105 A | 9/1998 | Van de Ven | 345/83 |
| 7,598,686 B2 | 10/2009 | Lys et al. | 315/312 |
| 8,115,419 B2* | 2/2012 | Given et al. | 315/307 |
| 8,203,286 B2* | 6/2012 | Roberts et al. | 315/307 |
| 8,427,075 B2 | 4/2013 | Brown et al. | 315/307 |
| 2004/0245946 A1 | 12/2004 | Halter | 315/312 |
| 2005/0012457 A1 | 1/2005 | Wu | 315/512 |
| 2007/0229001 A1 | 10/2007 | Mcintosh et al. | 315/307 |
| 2008/0012507 A1 | 1/2008 | Nalbant | 315/306 |
| 2008/0048567 A1* | 2/2008 | Steele et al. | 315/151 |
| 2008/0128597 A1* | 6/2008 | Smith et al. | 250/222.1 |
| 2008/0315788 A1 | 12/2008 | Levey et al. | 315/291 |
| 2009/0026976 A1 | 1/2009 | Pohler | 315/294 |
| 2009/0212937 A1* | 8/2009 | Stamer et al. | 340/506 |
| 2010/0045210 A1 | 2/2010 | Hariharan | 315/297 |
| 2010/0103082 A1* | 4/2010 | Levey et al. | 345/76 |

FOREIGN PATENT DOCUMENTS

| | | | |
|---|---|---|---|
| GB | 2436404 A | 9/2007 | H02H 9/00 |
| WO | 2008/007121 A1 | 1/2008 | H04N 1/48 |

OTHER PUBLICATIONS

International Search Report and Written Opinion, Application No. PCT/US2009/067625, 18 pages, Mar. 30, 2010.

* cited by examiner

*Primary Examiner* — Tung X Le
(74) *Attorney, Agent, or Firm* — King & Spalding L.L.P.

(57) ABSTRACT

A constant current output sink or source eliminates a current limiting series resistor for a light emitting diode (LED) and maintains a constant light intensity from the LED for all operating and manufacturing variables of a digital device since the current through the LED is maintained at a constant value. The constant current output sink or source may be programmable for selection of a constant current value from a plurality of constant current values available.

25 Claims, 8 Drawing Sheets

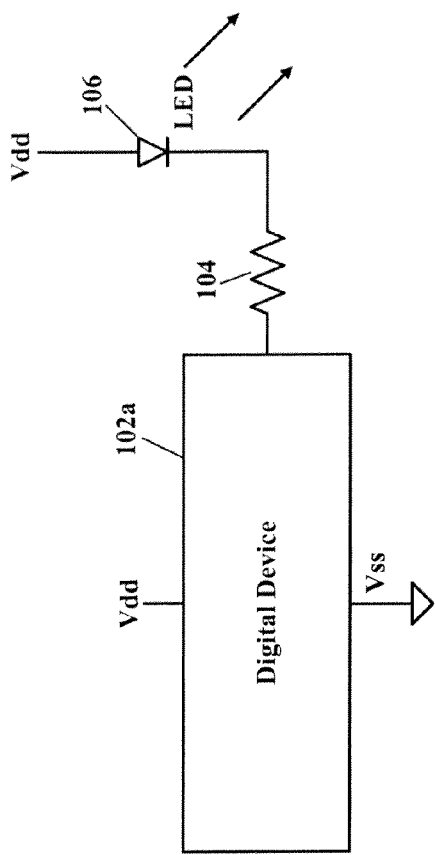
FIGURE 1 (Prior Technology)
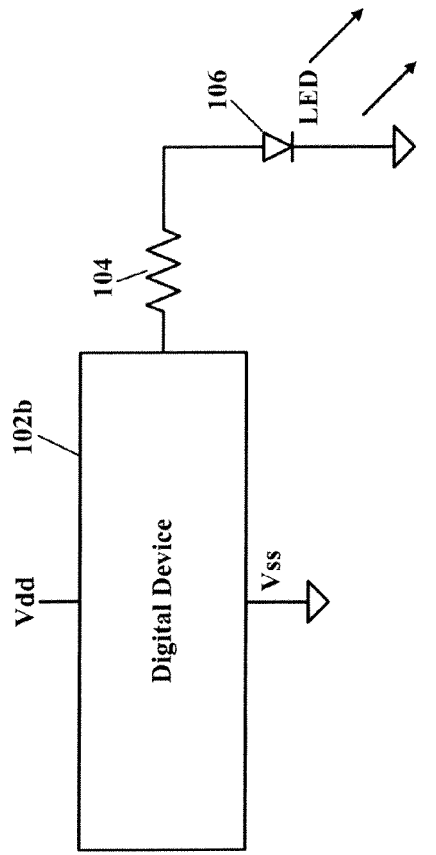
FIGURE 2 (Prior Technology)

CONSTANT CURRENT OUTPUT SINK OR SOURCE

RELATED PATENT APPLICATION

This application is a continuation of U.S. patent application Ser. No. 12/622,745 filed on Nov. 20, 2009, now U.S. Pat. No. 8,427,075 issued on Apr. 23, 2013, which claims priority to commonly owned U.S. Provisional Patent Application 61/121,932; filed Dec. 12, 2008; the contents of which are hereby incorporated by reference in their entirety.

TECHNICAL FIELD

The present disclosure relates to controlling devices requiring a constant current for proper operation thereof and, more particularly, to controlling a light emitting diode (LED) while maintaining a constant current therethrough so that the light intensity of the LED remains substantially constant over a wide range of voltages, temperatures and other process variables.

BACKGROUND

LED forward voltage varies due to manufacturing process variables and application ambient temperature. A LED device driver, e.g., digital device output driver low or high voltage state (e.g., output near Vss or Vdd, respectively) varies due to manufacturing process variables, amount of current being sinked or sourced therein and application ambient temperature. This results in unacceptable LED light intensity consistency when a fixed resistor is used in series with the LED to limit current therethrough. LED device driver output sink and source current varies with power supply voltage, Vdd, and operating temperature, thereby resulting in an undesirable LED intensity variation over any change in temperature and/or operating voltage. Also a fixed current limiting resistor is required in series with the LED that adds additional cost and complexity to products using LEDs.

SUMMARY

What is needed is a way to maintain the LED light intensity over a wide range of voltages, temperatures and manufacturing process variables. According to the teachings of this disclosure, a constant current output sink or source eliminates the current limiting series resistor for the LED and maintains a constant light intensity from the LED for all operating and manufacturing variables of an integrated circuit digital device, e.g., microcontroller, microprocessor, digital signal processor, application specific integrated circuit (ASIC), programmable logic array (PLA), etc.

According to the teachings of this disclosure, maintaining a constant current, e.g., current limiting, at an output driver when sinking or sourcing a load such as a LED will maintain the light intensity of the LED at constant level for all operating and manufacturing variables. This current limiting feature may be enabled or disabled, and the current limit value set under program control, e.g., by using internal control registers in the digital device (e.g., microcontroller). Each output of the digital device may have current sink or source limiting capabilities that have an associated control bit that enables the current limiting feature. Another multi-bit register may determine the value of the constant current, whereby the range and resolution of the constant current value may be determined by the number of bits in this register. Limited output current sink or source may be set by the gate voltage of the field effect transistor (FET) output driver or several FETs operating at fixed gate voltages. A constant output sink or source current range may be adjustable, e.g., from about five (5) milliamperes (mA) to about 25 mA.

Also contemplated herein are switch applications using low current weak pull-ups that may be susceptible to noise. This may be overcome by setting current output to a low limit and using a direct connection to Vdd through the switch which would then raise the next stage input level closer to Vdd for improved noise tolerance.

According to a specific example embodiment, an integrated circuit digital device having a node that is current limited comprises: a node; and a programmable constant current circuit coupled to the node, wherein the programmable constant current circuit limits the amount of current through the node to a current value that is programmed into the programmable constant current circuit.

According to another specific example embodiment, an integrated circuit digital device having an output node that is current limited comprises: an output node; a high side drive circuit coupled between the output node and a power supply voltage; a first multiplexer having first, second and third nodes, and a control input for selectively coupling the first node to the second node or the first node to the third node, wherein the first node is coupled to the output node and the high side drive circuit; a second multiplexer having first, second and third nodes, and a control input for selectively coupling the first node to the second node or the first node to the third node, wherein the first node is coupled to a power supply common; a programmable constant current circuit coupled between the second node of the first multiplexer and the second node of the second multiplexer, wherein the programmable constant current circuit limits current therethrough to a current value that is programmed into the programmable constant current circuit; and a low side drive circuit coupled between the third nodes of the first and second multiplexers; wherein when the first and second nodes of the first and second multiplexers are coupled together the programmable constant current circuit limits current going into the output node to the current value, and when the first and third nodes of the first and second multiplexers are coupled together the low side drive circuit couples the output node to substantially the power supply common without limiting current thereto.

According to yet another specific example embodiment, an integrated circuit digital device having an output node that is current limited comprises: an output node; a low side drive circuit coupled between the output node and a power supply common; a first multiplexer having first, second and third nodes, and a control input for selectively coupling the first node to the second node or the first node to the third node, wherein the first node is coupled to a power supply voltage; a second multiplexer having first, second and third nodes, and a control input for selectively coupling the first node to the second node or the first node to the third node, wherein the first node is coupled to the output node and the low side drive circuit; a programmable constant current circuit coupled between the second node of the first multiplexer and the second node of the second multiplexer, wherein the programmable constant current circuit limits current therethrough to a current value that is programmed into the programmable constant current circuit; and a high side drive circuit coupled between the third nodes of the first and second multiplexers; wherein when the first and second nodes of the first and second multiplexers are coupled together the programmable constant current circuit limits current going from the output node to the current value, and when the first and third nodes of the first and second multiplexers are coupled together the high side drive circuit couples the output node to substantially the power supply voltage without limiting current thereto.

BRIEF DESCRIPTION OF THE DRAWINGS

A more complete understanding of the present disclosure may be acquired by referring to the following description taken in conjunction with the accompanying drawings wherein:

FIG. 1 is a schematic block diagram of a prior technology digital device having a driver circuit used for sinking current from a light emitting diode (LED);

FIG. 2 is a schematic block diagram of a prior technology digital device having a driver circuit used for sourcing current to a LED;

Figure 3:
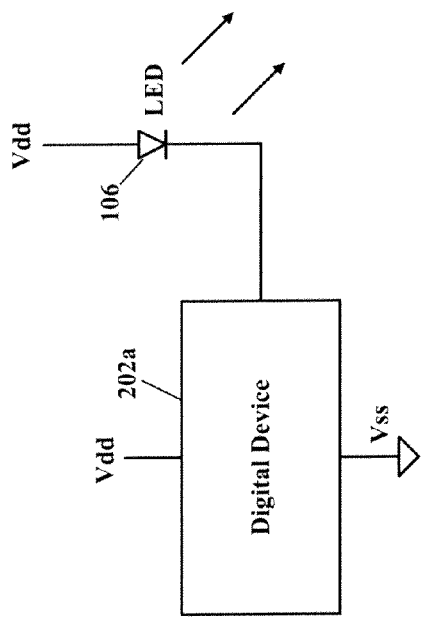
FIG. 3 is a schematic block diagram of a digital device having a driver circuit that sinks current from a LED at a constant current value, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a prior technology digital device having a driver circuit used for sinking current from a light emitting diode (LED). A LED 106 is coupled to a supply voltage Vdd and to an output of a digital device 102a through a current limiting resistor 104. Whenever the output of the digital device 102a goes to a logic low, current flows through the LED 106 and light is produced, wherein the current is limited by the resistor 104. When the output of the digital device 102a goes to a logic high, substantially no current flows through the LED 106 and no light is produced. The current limiting resistor 104 adds cost and complexity to a product requiring control of LEDs.

Referring to FIG. 2, depicted is a schematic block diagram of a prior technology digital device having a driver circuit used for sourcing current to a LED. A LED 106 is coupled to an output of a digital device 102b through a current limiting resistor 104 and to a power supply common Vss. Whenever the output of the digital device 102b goes to a logic high, current flows through the LED 106 and light is produced, wherein the current is limited by the resistor 104. When the output of the digital device 102b goes to a logic low, substantially no current flows through the LED 106 and no light is produced. The current limiting resistor 104 adds cost and complexity to a product requiring control of LEDs.

Referring to FIG. 3, depicted is a schematic block diagram of a digital device having a driver circuit that sinks current from a LED at a constant current value, according to the teachings of this disclosure. A LED 106 is coupled to a supply voltage Vdd and to an output of a digital device, e.g., digital device 202a. Whenever the output of the digital device 202a goes to a logic low, current flows through the LED 106 and light is produced, wherein the current is limited by current limiting circuits within the digital device 202a. When the output of the digital device 202a goes to a logic high, substantially no current flows through the LED 106 and no light is produced. Not requiring an external current limiting resistor between the LED 106 and the output of the digital device 202a reduces cost and complexity of a product requiring control of LEDs.

Figure 4:
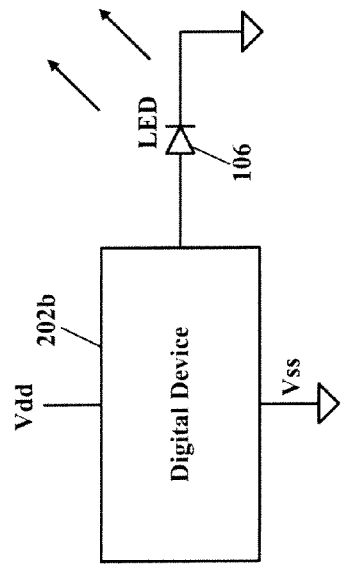
FIG. 4 is a schematic block diagram of a digital device having a driver circuit that sources current to a LED at a constant current value, according to the teachings of this disclosure.

Referring to FIG. 4, depicted is a schematic block diagram of a digital device having a driver circuit that sources current to a LED at a constant current value, according to the teachings of this disclosure. A LED 106 is coupled to an output of a digital device, e.g., digital device 202b and to a power supply common Vss. Whenever the output of the digital device 202b goes to a logic high, current flows through the LED 106 and light is produced, wherein the current is limited by current limiting circuits within the digital device 202b. When the output of the digital device 202b goes to a logic low, substantially no current flows through the LED 106 and no light is produced. Not requiring an external current limiting resistor between the LED 106 and the output of the digital device 202b reduces cost and complexity of a product requiring control of LEDs.

Figure 5:
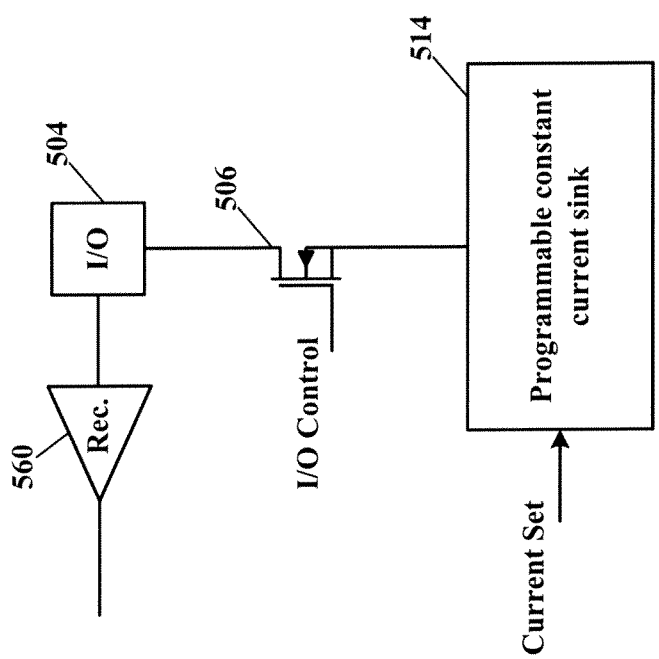
FIG. 5 is a schematic block diagram of a driver circuit that sinks current from a LED at a programmable constant current value, according to a specific example embodiment of this disclosure.

Referring to FIG. 5, depicted is a schematic block diagram of a LED driver circuit that sinks current from a LED at a programmable constant current, according to a specific example embodiment of this disclosure. An input-output node (I/O) 504 of a digital device, e.g., microcontroller (FIG. 3) is coupled to a switch 506 which is coupled to a programmable constant current sink 514. When a LED 106 is coupled to the I/O node 504 as shown in FIG. 3, a current will flow through the LED 106 and switch 506 (when closed) that is determined by the programmable constant current sink 514. The constant current value may be set to, for example but is not limited to, from about five (5) mA to about 25 mA. Selection of the constant current value may be determined by a current set signal to the programmable constant current sink 514. Optionally, a receiver 560 may be used to determine logic levels at the I/O node 504 when used as an input and/or an output node.

Figure 6:
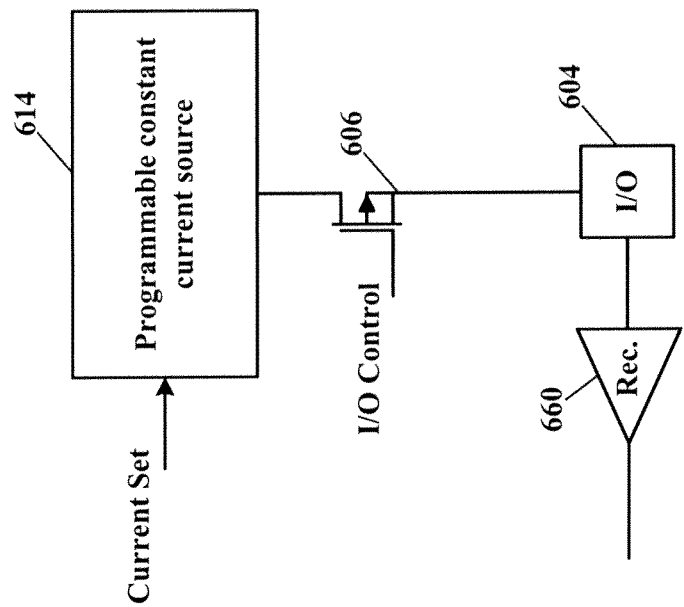
FIG. 6 is a schematic block diagram of a driver circuit that sources current to a LED at a programmable constant current, according to another specific example embodiment of this disclosure.

Referring to FIG. 6, depicted is a schematic block diagram of a LED driver circuit that sources current to a LED at a programmable constant current, according to another specific example embodiment of this disclosure. An input-output node (I/O) 604 of a digital device, e.g., microcontroller (FIG. 4) is coupled to a switch 606 which is coupled to a programmable constant current source 614. When a LED 106 is coupled to the I/O node 604 as shown in FIG. 4, a current will flow from the programmable constant current source 614, through the LED 106 and switch 606 (when closed) that is determined by the programmable constant current source 614. The constant current value may be set to, for example but is not limited to, from about five (5) mA to about 25 mA. Selection of the constant current value may be determined by a current set signal to the programmable constant current source 614. Optionally, a receiver 660 may be used to determine logic levels at the I/O node 604 when used as an input and/or an output node.

Figure 7:
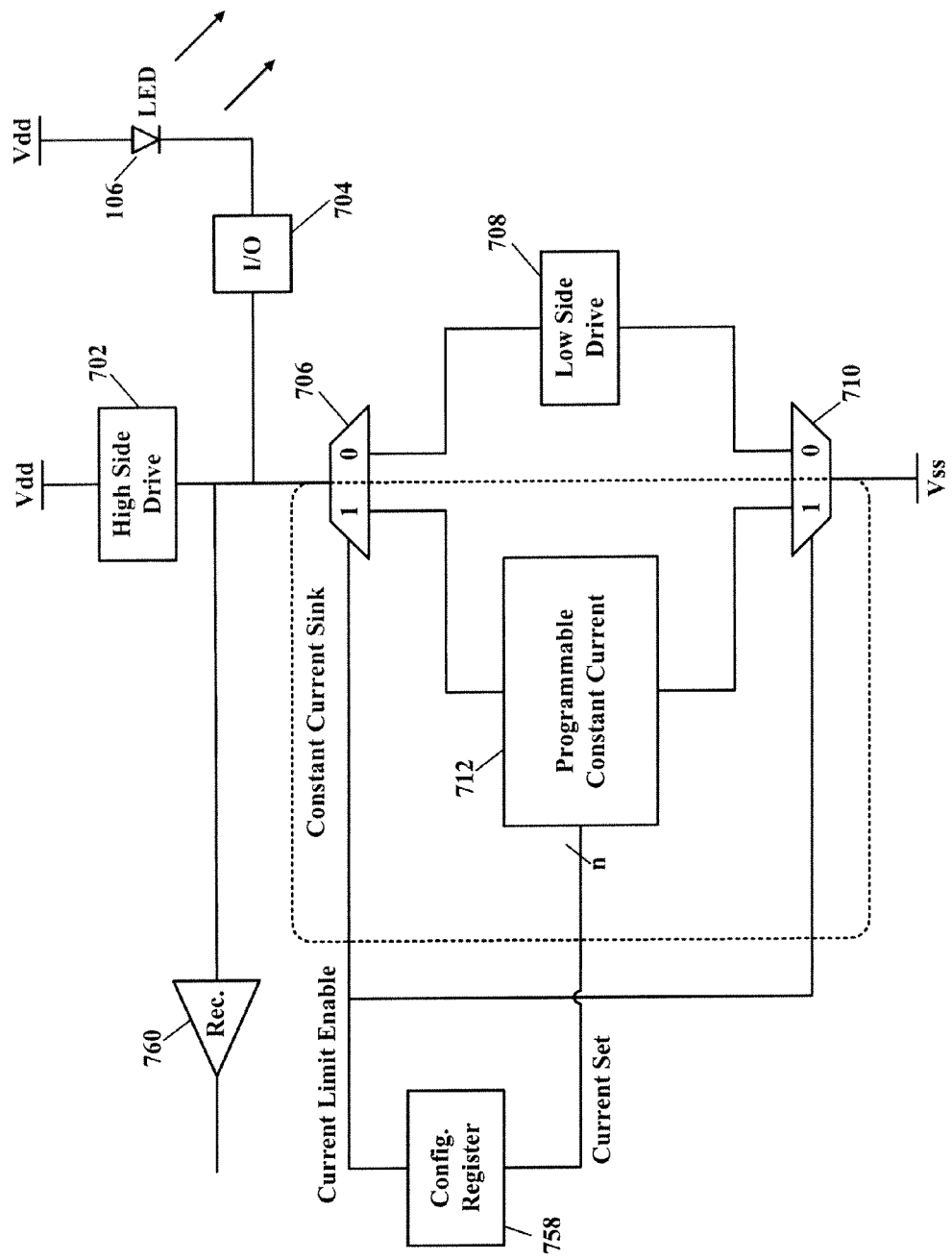
FIG. 7 is a schematic block diagram of an input-output (I/O) driver circuit that is selectable between sinking current from a LED at a programmable constant current or as a standard totem pole active output driver, according to yet another specific example embodiment of this disclosure.

Referring to FIG. 7, depicted is a schematic block diagram of an input-output (I/O) driver circuit that is selectable between sinking current from a LED at a programmable constant current or as a standard totem pole active output driver, according to yet another specific example embodiment of this disclosure. Multiplexers 706 and 710 may be used to switch between a programmable constant current sink 712 and a low side drive circuit 708, e.g., NMOS field effect transistor (FET). High side drive circuit 702, e.g., NMOS FET, pulls the I/O node 704 to substantially the power supply voltage, Vdd. The multiplexers 706 and 710 may be controlled with a current limit enable signal for selecting between the programmable constant current sink 712 and the low side drive circuit 708. Configurations, e.g., current limiting or non-current limiting, current limit value, etc., for the I/O node 704 may be stored in a configuration register 758. The configuration register 758 may be a volatile memory, e.g., random access memory (RAM), or a nonvolatile memory, e.g., programmable read only memory, Flash memory, etc.

For example, when a logic high is desired at the I/O node 704, the high side driver circuit 702 is enabled, the multiplexers 706 and 710 select the low side driver circuit 708, and the low side driver circuit 708 is disabled. When a logic low without current limiting is desired at the I/O node 704, the high side driver circuit 702 is disabled, the multiplexers 706 and 710 select the low side driver circuit 708, and the low side driver circuit 708 is enabled. When a logic low with current limiting is desired at the I/O node 704 (e.g., LED 106 on), the high side driver circuit 702 is disabled and the multiplexers 706 and 710 select the programmable constant current sink 712, thereby limiting current through the I/O node 704 to the selected current value. Optionally, a receiver 760 may be used to determine logic levels at the I/O node 704 when used as an input and/or an output node.

Figure 8:
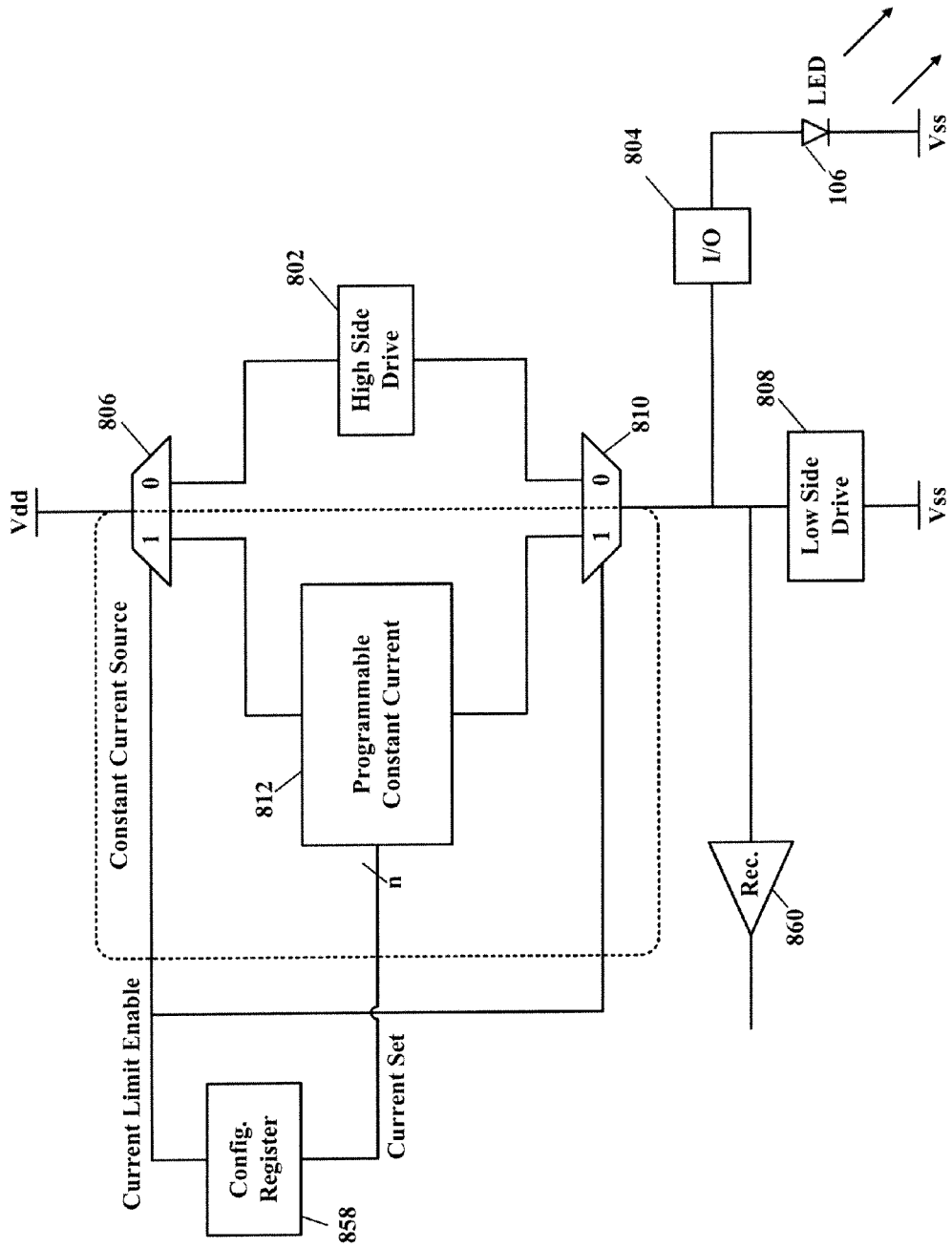
FIG. 8 is a schematic block diagram of an input-output (I/O) driver circuit that is selectable between sourcing current to a LED at a programmable constant current or as a standard totem pole active output driver, according to still another specific example embodiment of this disclosure.

Referring to FIG. 8, depicted is a schematic block diagram of an input-output (I/O) driver circuit that is selectable between sourcing current to a LED at a programmable constant current or as a standard totem pole active output driver, according to still another specific example embodiment of this disclosure. Multiplexers 806 and 810 may be used to switch between a programmable constant current source 812 and a high side drive circuit 802, e.g., PMOS field effect transistor (FET). Low side drive circuit 808 pulls the I/O node 804 to substantially the power supply common, Vss. The multiplexers 806 and 810 may be controlled with a current limit enable signal for selecting between the programmable constant current source 812 and the high side drive circuit 802. Configurations, e.g., current limiting or non-current limiting, current limit value, etc., for the I/O node 804 may be stored in a configuration register 858. The configuration register 858 may be a volatile memory, e.g., random access memory (RAM), or a nonvolatile memory, e.g., programmable read only memory, Flash memory, etc.

For example, when a logic low is desired at the I/O node 804, the low side driver 32 select the programmable constant current source 812, thereby limiting current through the I/O node 804 to the selected current value. Optionally, a receiver 860 may be used to determine logic levels at the I/O node 804 when used as an input and/or an output node.

Figure 9:
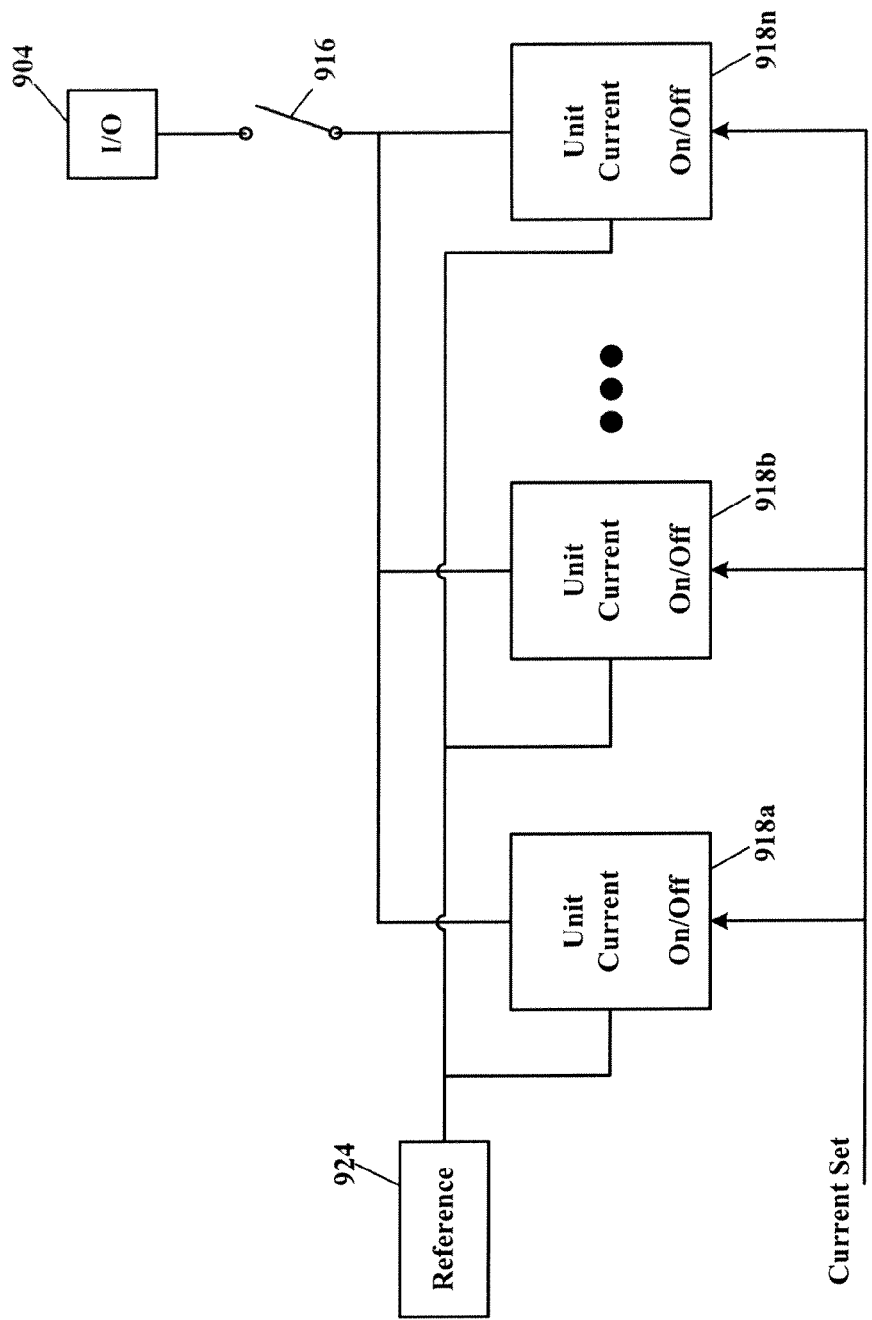
FIG. 9 is a schematic block diagram of a programmable constant current sink or source, according to the teachings of this disclosure.

Referring to FIG. 9, depicted is a schematic block diagram of a programmable constant current sink or source, according to the teachings of this disclosure. Each of a plurality of unit constant current blocks 918 may be switched on or off, wherein the combination of the plurality of constant current blocks 918a-918n switched on determine the constant current value allowed into the I/O node 904. A reference 924 may be used in combination with the plurality of unit constant current blocks 918 so as to maintain a specific constant current for each of the plurality of constant current blocks 918. Switch 916 may be used to disconnect the plurality of unit constant current blocks 918 from the I/O node 904.

Figure 10:
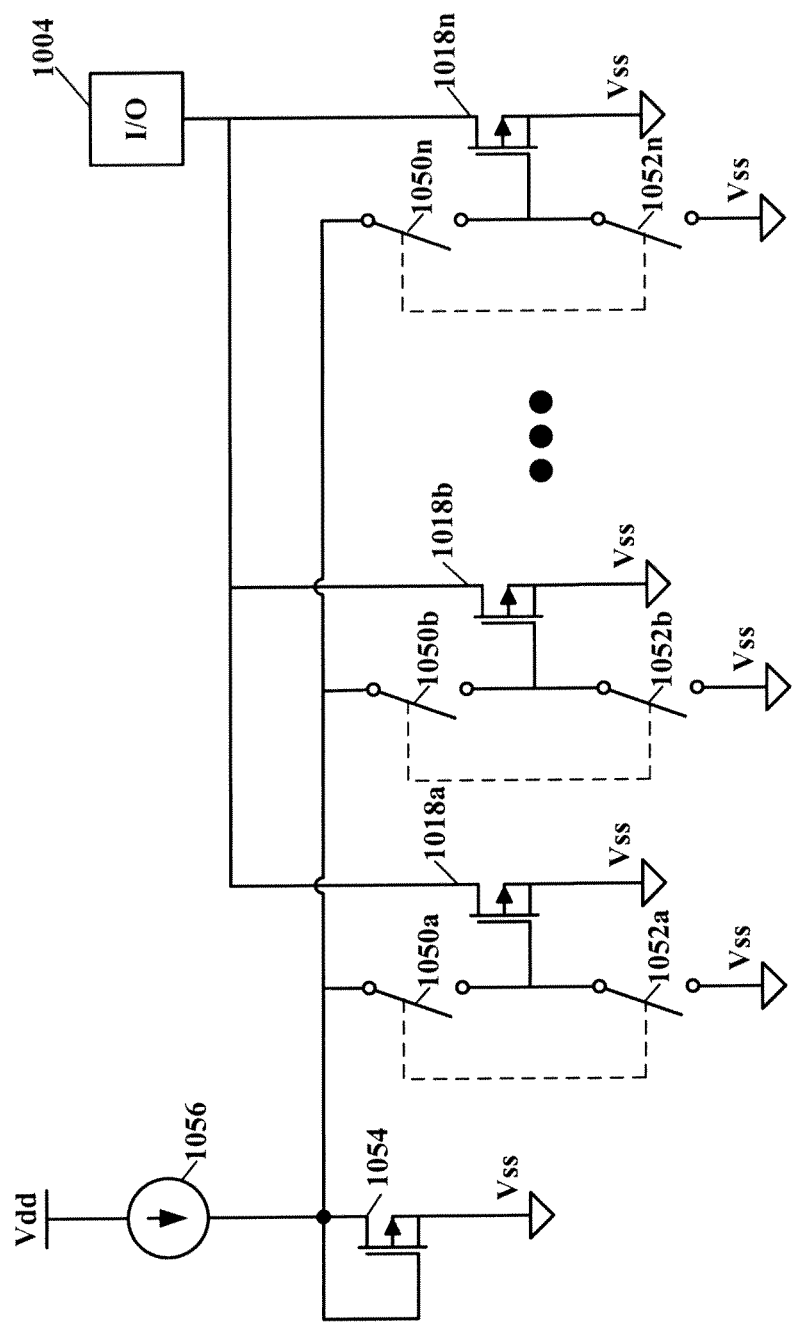
FIG. 10 is a detailed schematic diagram of a programmable constant current sink, according to the teachings of this disclosure.

Referring to FIG. 10, depicted is a detailed schematic diagram of a programmable constant current sink, according to the teachings of this disclosure. Transistor 1054 and constant current source 1056 are used to produce a voltage control signal that controls the amount of current that flows through each of a plurality of transistors 1018. Each of the switch pairs 1050 and 1052 selectively enable or disable respective ones of the plurality of transistors 1018. The constant current value that will pass into the I/O node 1004 may be programmed by enabling and disabling, with the respective switch pairs 1050 and 1052, an appropriate number of the plurality of transistors 1018.

Figure 11:
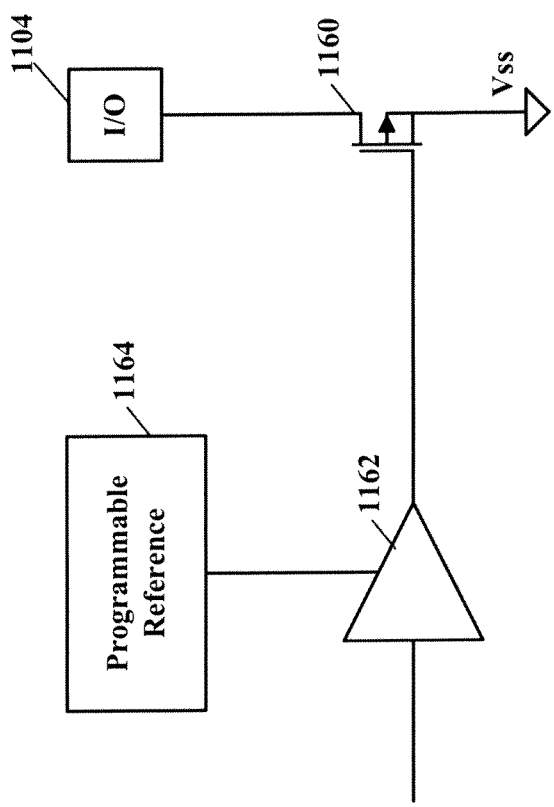
FIG. 11 is a schematic diagram of another programmable constant current sink, according to the teachings of this disclosure.

Referring to FIG. 11, depicted is a schematic diagram of another programmable constant current sink, according to the teachings of this disclosure. NMOS FET 1160 is coupled between the I/O node 1104 and power supply common, Vss. The value of current flowing through the NMOS FET 1160 may be determined by a voltage on the gate of the FET 1160. By changing this voltage, the current value may be changed. A programmable voltage reference 1164 may be used in combination with an amplifier 1162 to produce the control voltage at the gate of the FET 1160.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:
1. An integrated circuit device comprising a digital processor;
an output node controlled by said digital processor for an external connection of the integrated circuit; and a programmable constant current circuit coupled to the output node, wherein the programmable constant current circuit limits the amount of current through the output node to a current value that is programmed into the programmable constant current circuit.

2. The integrated circuit device according to claim 1, wherein the digital processor is a microcontroller.

3. The integrated circuit device according to claim 1, wherein the programmable constant current circuit sinks current from the node.

4. The integrated circuit device according to claim 1, wherein the programmable constant current circuit sources current to the node.

5. The integrated circuit device according to claim 1, further comprising a switch between the output node and the programmable constant current circuit, wherein when the switch is closed the programmable constant current circuit is coupled to the node, and when the switch is open the programmable constant current circuit is decoupled from the node.

6. The integrated circuit device according to claim 1, wherein the output node is an input/output node and the integrated circuit device further comprises a receiver for receiving logic levels from the node.

7. The integrated circuit device according to claim 1, further comprising a configuration register coupled to the programmable constant current circuit and storing the current value.

8. The integrated circuit device according to claim 1, wherein the configuration register is volatile memory.

9. The integrated circuit device according to claim 1, wherein the configuration register is nonvolatile memory.

10. The integrated circuit device according to claim 1, wherein the programmable constant current circuit comprises a plurality of constant current circuits that are selectably coupled in parallel for the current value.

11. The integrated circuit device according to claim 10, wherein the plurality of constant current circuits are coupled to a voltage reference.

12. The integrated circuit device according to claim 11, wherein the voltage reference is programmable.

13. The integrated circuit device according to claim 1, wherein the programmable constant current circuit is programmable from about five (5) milliamperes (mA) to about 25 mA.

14. The integrated circuit device according to claim 1, wherein the output node can be connected to a light emitting diode (LED) and the programmable constant current circuit regulates current through the LED to the current value.

15. The integrated circuit device according to claim 1, further comprising switching means for selectively enabling said programmable constant current circuit such that in a first mode the output node operates as a digital output node and in a second mode as a digital output node with a controlled constant current output.

16. The integrated circuit device according to claim 1, further comprising:
a high side drive circuit coupled between the output node and a power supply voltage;
a first multiplexer having first, second and third nodes, and a control input for selectively coupling the first node to the second node or the first node to the third node, wherein the first node is coupled to the output node and the high side drive circuit;
a second multiplexer having first, second and third nodes, and a control input for selectively coupling the first node to the second node or the first node to the third node, wherein the first node is coupled to a power supply common;
wherein the programmable constant current circuit is coupled between the second node of the first multiplexer and the second node of the second multiplexer; and
a low side drive circuit coupled between the third nodes of the first and second multiplexers;
wherein when the first and second nodes of the first and second multiplexers are coupled together the programmable constant current circuit limits current going into the output node to the current value, and when the first and third nodes of the first and second multiplexers are coupled together the low side drive circuit couples the output node to substantially the power supply common without limiting current thereto.

17. The integrated circuit device according to claim 16, further comprising a receiver for receiving logic levels from the output node.

18. The integrated circuit device according to claim 16, further comprising a configuration register coupled to the programmable constant current circuit and storing the current value.

19. The integrated circuit device according to claim 16, wherein the programmable constant current circuit is programmable from about five (5) milliamperes (mA) to about 25 mA.

20. The integrated circuit device according to claim 16, wherein the node is coupled to a light emitting diode (LED) and the programmable constant current circuit regulates current through the LED to the current value.

21. The integrated circuit device according to claim 1, further comprising:
a low side drive circuit coupled between the output node and a power supply common;
a first multiplexer having first, second and third nodes, and a control input for selectively coupling the first node to the second node or the first node to the third node, wherein the first node is coupled to a power supply voltage;
a second multiplexer having first, second and third nodes, and a control input for selectively coupling the first node to the second node or the first node to the third node, wherein the first node is coupled to the output node and the low side drive circuit;
wherein the programmable constant current circuit is coupled between the second node of the first multiplexer and the second node of the second multiplexer; and
a high side drive circuit coupled between the third nodes of the first and second multiplexers;
wherein when the first and second nodes of the first and second multiplexers are coupled together the programmable constant current circuit limits current going from the output node to the current value, and when the first and third nodes of the first and second multiplexers are coupled together the high side drive circuit couples the output node to substantially the power supply voltage without limiting current thereto.

22. The integrated circuit device according to claim 21, further comprising a receiver for receiving logic levels from the output node.

23. The integrated circuit device according to claim 21, further comprising a configuration register coupled with the control inputs of said first and second multiplexers for selecting an operating mode or said output node.

24. The integrated circuit device according to claim 21, wherein the programmable constant current circuit is programmable from about five (5) milliamperes (mA) to about 25 mA.

25. The integrated circuit device according to claim 21, wherein the node is coupled to a light emitting diode (LED) and the programmable constant current circuit regulates current through the LED to the current value.

* * * * *